United States Patent
Han et al.

(10) Patent No.: US 10,135,586 B2
(45) Date of Patent: Nov. 20, 2018

(54) REFERENCE SIGNAL ENHANCEMENT FOR SHARED CELL

(71) Applicant: Intel IP Corporation, Santa Clara, CA (US)

(72) Inventors: Seunghee Han, Cupertino, CA (US); Dae Jung Yoon, Santa Clara, CA (US); Yang Tang, Pleasanton, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/555,259

(22) Filed: Nov. 26, 2014

(65) Prior Publication Data

US 2015/0270936 A1 Sep. 24, 2015

Related U.S. Application Data

(60) Provisional application No. 61/968,269, filed on Mar. 20, 2014, provisional application No. 61/985,355, filed on Apr. 28, 2014.

(51) Int. Cl.
*H04W 4/00* (2018.01)
*H04L 5/00* (2006.01)

(52) U.S. Cl.
CPC .......... *H04L 5/0048* (2013.01); *H04L 5/0035* (2013.01); *H04L 5/0073* (2013.01); *H04L 5/0023* (2013.01); *H04L 5/0082* (2013.01)

(58) Field of Classification Search
CPC .................................................... H04L 5/0073
See application file for complete search history.

(56) References Cited

U.S. PATENT DOCUMENTS

| | | | |
|---|---|---|---|
| 9,642,126 B2 | 5/2017 | Park et al. | |
| 2011/0105144 A1 | 5/2011 | Siomina et al. | |
| 2011/0230144 A1 | 9/2011 | Siomina et al. | |
| 2012/0213109 A1* | 8/2012 | Xu | H04B 7/024 370/252 |
| 2012/0257515 A1* | 10/2012 | Hugl | H04B 7/0632 370/252 |
| 2013/0051317 A1 | 2/2013 | Ji et al. | |
| 2013/0079019 A1 | 3/2013 | Yu et al. | |
| 2013/0083780 A1 | 4/2013 | Luo et al. | |

(Continued)

FOREIGN PATENT DOCUMENTS

| | | |
|---|---|---|
| RU | 2012113552 A | 10/2013 |
| WO | 2011/136711 A1 | 11/2011 |

(Continued)

OTHER PUBLICATIONS

Huawei (R4-135165, 1,Scenario analysis for positioning in Het-Net scenarios, Riga, Latvia, Oct. 7-11, 2013).*

(Continued)

*Primary Examiner* — Maharishi V Khirodhar
(74) *Attorney, Agent, or Firm* — Schwabe, Williamson & Wyatt, P.C.

(57) ABSTRACT

In embodiments, apparatuses, methods, and storage media may be described for distinguishing, by a user equipment (UE), a reference signal (RS) transmitted by a cell that may have a same identifier (ID) as another cell in a network. In embodiments, a muting pattern, a time offset, or a virtual cell identifier (VCID) may be used to generate an RS sequence or RS resource allocation.

15 Claims, 11 Drawing Sheets

(56) References Cited

U.S. PATENT DOCUMENTS

| | | | |
|---|---|---|---|
| 2014/0038598 A1 | 2/2014 | Ren et al. | |
| 2014/0146689 A1* | 5/2014 | Gaur | H04J 11/0053 370/252 |
| 2015/0049649 A1 | 2/2015 | Zhu et al. | |
| 2015/0111505 A1* | 4/2015 | Kim | H04L 5/005 455/67.13 |
| 2015/0312927 A1* | 10/2015 | Ko | H04B 7/024 370/336 |

FOREIGN PATENT DOCUMENTS

| | | | |
|---|---|---|---|
| WO | 2013/180460 A1 | 12/2013 | |
| WO | 2014008665 A1 | 1/2014 | |
| WO | WO 2014008665 A1 * | 1/2014 | H04W 48/16 |
| WO | 2015/023224 A2 | 2/2015 | |

OTHER PUBLICATIONS

Pantech and Curitel(R1-094336, Muting for LTE Rel-9 OTODOA positioning, 3GPP TSG RAN WG1 Meeting #58-bis, Oct. 12-16, 2009).*

MediaTek (R1-140246, Performance comparison of small cell discovery signal designs, 3gpp TSG-RAN WG1 #76).*

Intel Corporation, "Further study on the positioning enhancement in HetNet scenario," 3GPP TSG RAN WG4 Meeting #72bis, R4-146535, Agenda Item: 9.4.4, Oct. 6-10, 2014, Singapore, 3 pages.

Intel Corporation, "Further study on the positioning enhancement in HetNet scenario," 3GPP TSG RAN WG4 Meeting #73, R4-147711, Agenda Item: 9.4.4, Nov. 17-21, 2014, San Francisco, CA, USA, 2 pages.

Office Action dated Apr. 15, 2016 from Taiwan Patent Application No. 104105379, 20 pages.

International Search Report and Written Opinion dated Apr. 27, 2015 from International Application No. PCT/ US2015/014368.

Samsung, "Discussion on the detection timing of small cell discovery signal," 3GPP TSG RAN WG1 #76, R1-140371, Agenda item: 7.2.4.2.2, Feb. 10-14, 2014, Prague, Czech Republic, 4 pages.

ZTE, "Enhanced small cell on/off mechanisms," 3GPP TSG RAN WG1 Meeting #76, R1-140285, Agenda Item: 7.2.4.2.1, Feb. 10-14, 2014, Prague, Czech Republic, 5 pages.

Mediatek Inc., "Performance comparison of small cell discovery signal designs," 3GPP TSG-RAN WG1 #76, R1-140246, Agenda Item: 7.2.4.2.2, Feb. 10-14, 2014, Prague, Czech Republic, 7 pages.

ETRI, "Discovery signal design for small cell on/off," 3GPP TSG RAN WG1 Meeting #76, R1-140213, Agenda Item: 7.2.4.2.2 Discovery signal(s) and measurements, Feb. 10-14, 2014, Prague, Czech Republic, 4 pages.

3GPP, "Technical Specification Group Radio Access Network; Evolved Universal Terrestrial Radio Access (E-UTRA); Physical channels and modulation (Release 11)," 3GPP TS 36.211 V11.5.0 (Dec. 2013), ,Dec. 20, 2013, Lte Advanced, 120 pages.

3GPP, "Technical Specification Group Radio Access Network; Evolved Universal Terrestrial Radio Access (E-UTRA); LTE Positioning Protocol (LPP) (Release 11)," 3GPP TS 36.355 V11.5.0 (Dec. 2013), Jan. 7, 2014, Lte Advanced, 118 pages.

3GPP, "Technical Specification Group Radio Access Network; Evolved Universal Terrestrial Radio Access (E-UTRA); Radio Resource Control (RRC); Protocol specification (Release 12)," 3GPP TS 36.331 V12.1.0 (Mar. 2014), Mar. 19, 2014, 356 pages.

3GPP, "Technical Specification Group Radio Access Network; Small cell enhancements for E-UTRA and E-UTRAN—Physical layer aspects (Release 12)," 3GPP TR 36.872 V12.1.0 (Dec. 2013), Dec. 20, 2013, Lte Advanced, 100 pages.

Office Action dated Aug. 22, 2016 from Taiwan Patent Application No. 104105379, 8 pages.

Office Action dated Feb. 6, 2017 from Canadian Patent Application No. 2,937,797, 3 pages.

Examiner's Report dated Apr. 28, 2017 from Canadian Patent Application No. 2,954,509, 3 pages.

Examiner's Report dated Apr. 20, 2017 from Australian Patent Application No. 2015231953, 4 pages.

Examiner's Report dated Sep. 5, 2017 from Canadian Patent Application No. 2,937,797, 7 pages.

Extended European Search Report dated Oct. 6, 2017 from European Patent Application No. 15765556.4, 12 pages.

NTT DOCOMO, "Small Cell Discovery for Efficient Small Cell on/Off Operation," 3GPP TSG RAN WG1 Meeting #74, R1-133457, Agenda Item: 7.2.6.1.2, Aug. 19-23, 2013, Barcelona, Spain, 8 pages.

Office Action dated Sep. 19, 2017 from Japanese Patent Application No. 2016-553442, 7 pages.

INTEL Corporation, "Discussion on the Otdoa enhancement in HetNet scenarios," 3GPP TSG-RAN WG4 Meeting #69, R4-136197, Agenda Item: 10.6.4, Nov. 11-15, 2013, San Francisco, CA, US, 3 pages.

INTEL Corporation, "Further study on the positioning enhancement in HetNet scenario," 3GPP TSG-RAN WG4 Meeting #70 Bis, R4-141586, Agenda Item: 9.4.4, Mar. 31-Apr. 4, 2014, San Jose del Cabo, Mexico, 4 pages.

Motorola Mobility, "Small cell discovery," 3GPP TSG RAN WG1 #72bis, R1-131519, Agenda item: 7.2.5.3.2, Apr. 15-19, 2013, Chicago, USA, 2 pages.

Office Action dated Sep. 21, 2017 from Russian Patent Application No. 2016134127, 9 pages.

Office Action dated Oct. 31, 2017 from Taiwan Divisional Application No. 106102182, 10 pages.

Russian Patent Office—Office Action dated Mar. 6, 2018 from Russian Patent Application No. 2017101071, 6 pages.

Canadian Patent Office—Examiner's Report dated Mar. 29, 2018 from Canadian Divisional Application No. 2,954,509, 4 pages.

Notice of Preliminary Rejection dated Dec. 12, 2017 from Korean Patent Application No. 10-2016-7022719, 21 pages.

Taiwan Patent Office—Office Action dated Jul. 10, 2018 from Taiwan Divisional Application No. 106102182, 18 pages.

Russian Patent Office—Office Action dated Jul. 26, 2018 from Russian Divisional Application No. 2017101071, 5 pages.

European Patent Office—Article 94(3) dated Aug. 10, 2018 from European Patent Application No. 15765556.4, 6 pages.

Mexican Patent Office—Office Action dated Apr. 16, 2018 from Mexican Patent Application No. MX/a/2016/011306, 7 pages U.S. Patent Office—Final Office Action dated Apr. 11, 2018 from U.S. Appl. No. 15/392,826, 15 pages.

Australian Patent Office—Examiner's Report dated Sep. 14, 2018 from Australian Divisional Application No. 2018201711, 3 pages.

* cited by examiner

REFERENCE SIGNAL ENHANCEMENT FOR SHARED CELL

CROSS REFERENCE TO RELATED APPLICATION

The present application claims priority to U.S. Provisional Patent Application No. 61/985,355, filed Apr. 28, 2014, entitled "Reference Signal Enhancement for Shared Cell ID Scenario," and U.S. Provisional Patent Application No. 61/968,269, filed Mar. 20, 2014, entitled "OTDOA Based Positioning Enhancement," the entire disclosures of which are hereby incorporated by reference in their entirety.

FIELD

Embodiments of the present invention relate generally to the technical field of reference signal identification in cellular radio networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

In some networks, observed time difference of arrival (OTDOA) may be used to locate the physical position of a user equipment (UE). Specifically, a reference signal (RS) such as a positioning reference signal (PRS) may be transmitted from multiple transmit stations (sometimes also referred to as transmit points (TPs)), and the UE may measure a reference signal time difference (RSTD) for each received RS. The transmit stations may be, for example, access points, evolved NodeBs (eNBs), remote radio heads (RRHs), or some other type of base station for a network (collectively referred to herein as "transmit stations").

In some cases, the transmit stations may be transmit stations of a coordinated multiple point (CoMP) network scenario-4. In those cases, the transmit stations may have identical physical cell identifiers (PCIDs). In such a scenario, the RS sequence or resource element (RE) allocation of the RSs of each transmit station may be identical because the RS sequence and RE mapping may be initialized by the identical PCIDs, which may result in identical RSs. Additionally, the REs on which the RSs are transmitted may be identical because the resource element allocation may also be based on the identical PCIDs. Because the transmitted RSs from the multiple transmit stations are identical, and transmitted on identical REs, the received signal at the UE may appear as single frequency network (SFN) combined waveforms which may be indistinguishable from one another. Therefore, the UE may not be able to measure RSTD for each cell.

Similarly, primary synchronization signals (PSSs), secondary synchronization signals (SSSs), cell specific reference signals (CRSs), and channel state information reference signals (CSI-RSs) (collectively referred to herein as discovery reference signals (DRSs)) from the different TPs may also be indistinguishable from one another because the DRSs may also be based on the identical PCID used by each transmit station. As used herein, the various reference signals such as PRS, PSS, SSS, CRS, CSI-RS, DRS, etc., will be generically referred to as "RSs."

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In embodiments, apparatuses, methods, and storage media may be described for distinguishing, by a UE, an RS such as a PRS or a DRS transmitted by a cell that may have a same ID, and specifically the same PCID, as another cell in a network. In embodiments, a muting pattern, a time offset, or a virtual cell identifier (VCID) may be used to generate an RS sequence or RS resource allocation. In embodiments, the UE may receive the RS and associate it with one or more of the time offset, the muting pattern, or the VCID. The UE may also measure a parameter of the RS such as the RSTD, a radio resource management (RRM) measurement, or some other measurement that may be used for calculating a physical location of the UE. The UE may then report the measurement and an indication of the VCID, the muting pattern, and/or the time offset to a serving cell for RRM measurement, or to a serving mobile location center (SMLC) to calculate an OTDOA parameter related to the UE.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As discussed herein, the term "module" may be used to refer to one or more physical or logical components or elements of a system. In some embodiments a module may be a distinct circuit, while in other embodiments a module may include a plurality of circuits.

Figure 1:
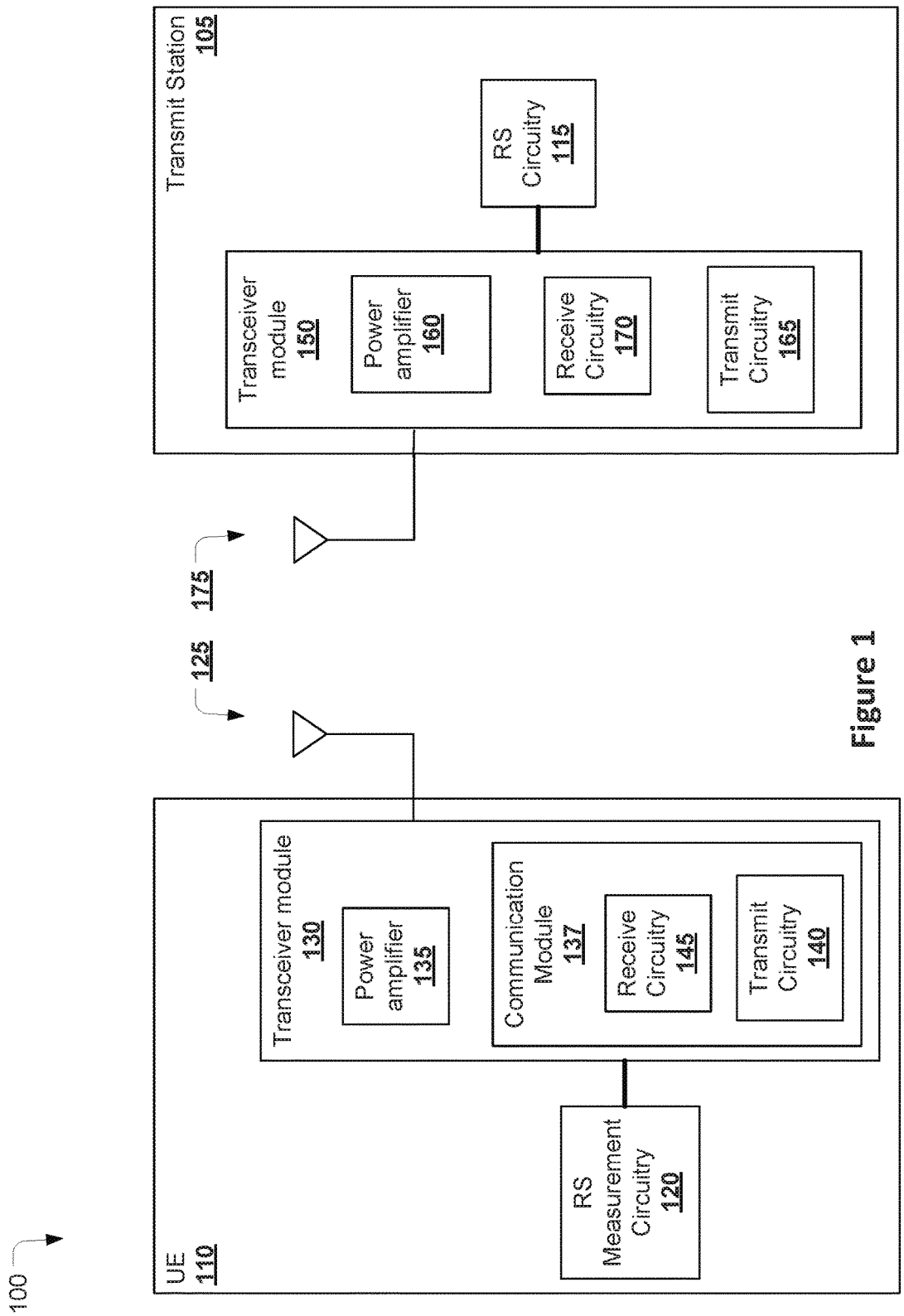
FIG. 1 schematically illustrates a high-level example of a network that includes a UE and an eNB, in accordance with various embodiments.

FIG. 1 schematically illustrates a wireless communication network 100 (hereinafter "network 100") in accordance with various embodiments. The network 100 may include a UE 110 that is communicatively coupled with transmit station 105. In embodiments, the network 100 may be a third generation partnership project (3GPP) Long Term Evolution (LTE), LTE Advanced (LTE-A) and/or LTE-Unlicensed (LTE-U) network. In other embodiments, the network 100 may be some other type of wireless communication network.

As shown in FIG. 1, the UE 110 may include a transceiver module 130, which may also be referred to as a multi-mode transceiver chip. The transceiver module 130 may be configured to transmit and receive signals using one or more protocols such as LTE, LTE-A, and/or LTE-U protocols. Specifically, the transceiver module 130 may be coupled with one or more of a plurality of antennas 125 of the UE 110 for communicating wirelessly with other components of the network 100, e.g., transmit station 105 or another UE. The antennas 125 may be powered by a power amplifier 135 which may be a component of the transceiver module 130 as shown in FIG. 1, or separate from but coupled with the transceiver module 130. In one embodiment, the power amplifier 135 may provide the power for all transmissions on the antennas 125. In other embodiments, there may be multiple power amplifiers on the UE 110. The use of multiple antennas 125 may allow for the UE 110 to use transmit diversity techniques such as spatial orthogonal resource transmit diversity (SORTD), multiple-input multiple-output (MIMO), or full-dimension MIMO (FD-MIMO).

In certain embodiments the transceiver module 130 may include a communication module 137, which may be referred to as a baseband module, which may contain both transmit circuitry 140 configured to cause the antennas 125 to transmit one or more signals from the UE 110, and receive circuitry 145 configured to process signals received by the antennas 125. In other embodiments, the communication module 137 may be implemented in separate chips or modules, for example, one chip including the receive circuitry 145 and another chip including the transmit circuitry 140. In some embodiments, the transmitted or received signals may be cellular signals transmitted to or received from transmit station 105. In some embodiments, the transceiver module 130 may include or be coupled with RS measurement circuitry 120 to measure one or more parameters or characteristics of a received RS, as described in further detail below. The RS measurement circuitry 120 may be further to associate the received RS with a transmit station and generate a measurement report related to the received RS.

Similar to the UE 110, the transmit station 105 may include a transceiver module 150. The transceiver module 150 may be further coupled with one or more of a plurality of antennas 175 of the transmit station 105 for communicating wirelessly with other components of the network 100, e.g., UE 110. The antennas 175 may be powered by a power amplifier 160 which may be a component of the transceiver module 150, as shown in FIG. 1, or may be a separate component of the transmit station 105. In one embodiment, the power amplifier 160 may provide the power for all transmissions on the antennas 175. In other embodiments, there may be multiple power amplifiers on the transmit station 105. The use of multiple antennas 175 may allow for the transmit station 105 to use transmit diversity techniques such as SORTD, MIMO, or FD-MIMO. In certain embodiments the transceiver module 150 may contain both transmit circuitry 165 configured to cause the antennas 175 to transmit one or more signals from the transmit station 105, and receive circuitry 170 to process signals received by the antennas 175. In other embodiments, the transceiver module 150 may be replaced by transmit circuitry 165 and receive circuitry 170 which are separate from one another (not shown). In some embodiments, though not shown, the transceiver module 150 may include a communication module such as communication module 137 that includes the receive circuitry 170 and the transmit circuitry 165. In some embodiments, the transmit station 105 may include RS circuitry 115, which may be configured to generate an RS based on one or more code, time, or muting related parameters as described in further detail below.

Figure 2:
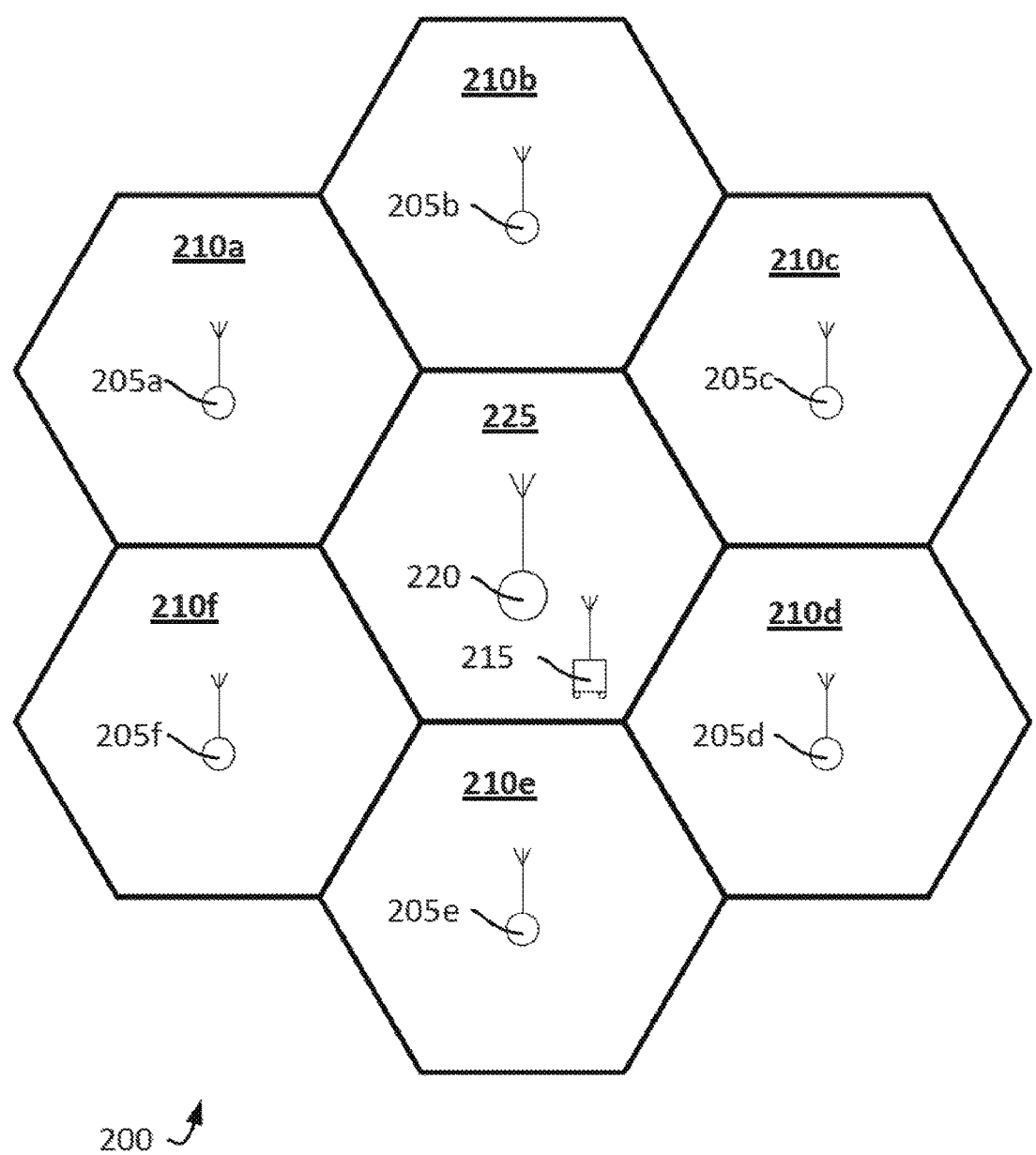
FIG. 2 schematically illustrates a high-level example of a network that includes a plurality of cells, in accordance with various embodiments.

FIG. 2 schematically illustrates a high-level example of a network 200 that may include several cells such as cells 210a, 210b, 210c, 210d, 210e, and 210f (collectively referred to as cells 210). Each cell 210 may include a transmit station such as transmit stations 205a, 205b, 205c, 205d, 205e, and 205f (collectively referred to as transmit stations 205). The transmit stations 205 may be similar to transmit station 105 of FIG. 1. Each transmit station 205 may be configured to send or receive signals to or from UEs in the respective cell 210 of the transmit station 205. The network 200 may further include a cell 225 with an eNB 220 configured to send or receive signals to or from UEs in the cell 225. The eNB 220 may also be similar to transmit station 105 of FIG. 1. The network may further include a UE 215 that may be similar to UE 110 of FIG. 1. Specifically, the UE 215 may be configured to send and/or receive information to/from the eNB 220 and/or the transmit stations

205. As used herein, if transmit stations are generically described as sending an RS, the description of the transmit stations may include the eNB 220.

It will be understood that although the cells 210 and 225 are shown as having a generally hexagonal shape, such illustration is for the purposes of example only and the cells 210 and 225 may have a different shape in different embodiments. Additionally, in embodiments, the UE 215 may be in a different one of the cells of network 200 than cell 225. Additionally, in embodiments the different cells 210 or 225 of the network 200 may overlap one another.

In embodiments, the eNB 220 may generally be configured to send and receive messages to a macrocell which may include cells 225 and 210. Cells 210 may be referred to as small cells and be considered a sub-cell of the macro cell. Each transmit station 205 may be responsible for sending or receiving information to or from a UE 215 in its respective small cell 210 as described above.

In embodiments, the transmit stations 205 may be RRHs, and the network 200 may be configured as a coordinated multi point (CoMP) network scenario-4 wherein the carrier frequencies of eNB 220 and the transmit stations 205 are the same. Specifically, the eNB 220 may direct one or more of the transmit stations 205 to send the same signal to a UE 215 to ensure that the UE 215 adequately and accurately receives the signal. In such networks, it may be desirable to employ one or more positioning techniques regarding the physical location of the UE 215. One such technique may be observed time difference of arrival (OTDOA) wherein the UE may measure one or more parameters of a received RS from the eNB 220 and/or transmit stations 205. The UE 215 may then report the measurements to the eNB 220 which may then identify the physical location of the UE 215 in the network.

Specifically, the UE 215 may measure the time difference between specific position reference signals (PRSs) from multiple transmit stations 205 and/or the eNB 220. The UE 215 may measure and report the reference signal time difference (RSTD) of each received PRS to the eNB 220 or an SMLC (not shown in FIG. 2 for the sake of clarity). In other embodiments, the UE 215 may measure and report an RRM measurement related to a DRS. In some embodiments the SMLC may be an element of the eNB 220, while in other embodiments the SMLC may be separate from but communicatively coupled with the eNB 220 and/or UE 215. In some embodiments the UE 215 may transmit the measurements directly to the SMLC, while in other embodiments the UE 215 may transmit the measurements to the eNB 220 for forwarding to the SMLC. Based on the received measurements, the SMLC may calculate the geographic location of the UE 215 based on the RSTD reports and the knowledge of the geographic positions of the eNB 220 and transmit stations 205.

In embodiments, the UE may measure the RSTD of a PRS, a DRS, or some other RS as described above. In some embodiments, the PRS may be used because the PRS may be an RS that is specifically designed for accurate position measurements of the UE 215. In some embodiments, the network 200 may be configured to measure on the order of tens of OTDOAs from multiple transmit stations 205 using PRSs, while the use of a DRS such as a CRS may result in a limitation regarding the number of OTDOAs that may be measured. Generally, a higher number of reported OTDOAs may result in a more accurate calculation of the UE's geographic position.

In some embodiments, an RS may be generated based on a scrambling seed. Specifically, a pseudo-random sequence generator may be initialized with $c_{init}=2^{10}\cdot(7\cdot(n_s+1)+l+1)\cdot(2\cdot N_{ID}^{cell}+1)+2\cdot N_{ID}^{cell}+N_{CP}$ (hereinafter referred to as equation 1). Specifically, $n_s$ may refer to a slot number within a radio frame in which the RS is to be transmitted. l may refer to the orthogonal frequency division multiplexing (OFDM) symbol number within the slot on which the RS is to be transmitted. $N_{ID}^{cell}$ may refer to an identifier (ID) of the cell such as cells 210.

Additionally, allocation of REs used to transmit the RS may be based on the equation $v_{shift}=N_{ID}^{cell}$ mod 6 (hereinafter referred to as equation 2) where $v_{shift}$ is a number of REs that an RS pattern is shifted in a resource block (RB). As can be seen, the value $N_{ID}^{cell}$ may be an important factor to specify both the RS sequence (based on $c_{init}$) and the RS RE allocation per cell (based on $v_{shift}$).

However, as noted above in a network such as network 200 that is configured to use CoMP network scenario-4 deployment such that each cell 210, and specifically each transmit station 205, has a same physical cell identifier (PCID), OTDOA calculations may be difficult to perform. This is because the value used for $N_{ID}^{cell}$ may be the PCID of the various cells 210. However, if the cells 210 are assigned the same PCID, then the cells may transmit the same RS sequence using the same REs as one another. Because the RS sequences may be identical and using the same REs, the UE 215 may be unable to distinguish which RS was transmitted from which cell 210. Therefore, the UE may not be able to accurately measure and report RSTD, RRM, or other OTDOA measurements that may be used to identify the physical location of the UE 215 in the network 200. Specifically, with regard to PRS, the RSTD measurements of the PRS may become a superposition of multi-path channels because the same PCID may be used for PRS sequence scrambling and RE mapping, and so the PRSs from different transmit stations 205 may be indistinguishable from one another. RRM measurements of a DRS, and particularly a CRS, may experience the same superposition of the CRS or DRS because the same PCID is used to generate those RSs, and so the CRSs or DRS may be indistinguishable from one another.

In order to resolve the difficulty of the UE 215 in identifying RSs from same or similar cells 210, one or more approaches may be used. In one embodiment, the eNB 220 and the transmit stations 205 may transmit the PRS or DRS in a frequency-division or a code-division manner. Alternatively, the eNB 220 may schedule PRS or DRS transmission by assigning different time instances such as subframes or radio frames in which the transmit stations 205 are to transmit respective PRSs or DRSs. Specifically, if the PRSs or DRSs are transmitted in different time instances, then the UE 215 may be able to identify which RS came from which transmit station 205.

Time Offset

In one embodiment, the PRSs or DRSs may be transmitted in a time-division manner. That is, the various RSs may be transmitted in different time instances from one or more different transmit stations 205 and/or the eNB 220. As used herein, the time offset will be generically referred to as a "time instance," but may refer to the OFDM symbol level, the slot level, the subframe level, the radio frame level, or according to some other time-division of a radio transmission. If the RS transmission may be differentiated over different time instances, then it may be possible for the UE 215 to measure and distinguish measurements such as RSTD or RRM measurements based on the PRS or DRS, respectively, from different cells 210.

Specifically, the UE 215 may receive or be pre-provisioned with one or more network-configured time-offset parameters as are described in greater detail below. The network-configured time-offset parameters may relate to a time offset of an RS transmission such as a PRS or DRS transmission. Because the UE 215 may receive the network-configured time-offset parameter, the UE 215 may be able to identify which of the transmit stations 205 sent which RS, and calculate a measurement such as an RSTD or RRM measurement based on the identified transmit station 205. The UE 215 may then report a measurement of the RS transmission such as RRM measurement or an RSTD that may be used for calculating an OTDOA. In some embodiments, for example, when PRSs are used for location determination, fields of an LTE positioning protocol (LPP) message may be used to provision the UE 215 with one or more of the network-configured time-offset parameters. For example, the network-configured time-offset parameters may be included in a PRS-Info field for PRSs by LPP signaling, or some other field for DRSs or some other RS by RRC signaling.

Along with reporting the RSTD or RRM measurements to the eNB 220 and/or SMLC as described above, the UE 215 may report one or more network-configured time-offset parameters related to the time offset, or an indication of which of the transmit stations 205 transmitted the RS. Specifically, the UE 215 may report an indication of a network-configured time-offset parameter such as a PRS or DRS configuration index, which may be generally referred to as $I_{PRS}$ or $I_{DRS}$, respectively. In embodiments, the $I_{PRS}$ may be referred to as a "prs-ConfigurationIndex" and may have a value between 0 and 4095. A similar name or value may be used for the $I_{DRS}$.

In embodiments, the network-configured time-offset parameter may be or include a PRS or DRS periodicity, which may be generally referred to as $T_{PRS}$ or $T_{DRS}$, respectively, and may be included as an element of the configuration index described above. The network-configured time-offset parameter may additionally or alternatively be or include an indication of PRS or DRS subframe offset, which may be generally referred to as $\Delta_{PRS}$ or $\Delta_{DRS}$, respectively, which may also be an element of the configuration index described above. In embodiments, the PRS or DRS subframe offset may indicate a number of subframes by which the PRS or DRS should be offset, and in other embodiments the parameter may be referred to as a PRS or DRS time instance offset and refer to a number of slots, OFDM symbols, subframes, or radio frames by which the PRS or DRS should be offset. In some embodiments $T_{PRS}$, $T_{DRS}$, $\Delta_{PRS}$, or $\Delta_{DRS}$ may be separate from the PRS or DRS configuration index. In some embodiments, the UE 215 may also report information regarding a network-configured time-offset parameter such as a muting pattern of the RS transmissions, as described in further detail below. In some embodiments, the UE 215 may report other information or parameters that may be used to measure RSTD, reference signal received quality (RSRQ), reference signal received power (RSRP), or some other parameter that may be used to measure or identify a parameter used for OTDOA measurements.

In some embodiments, the network-configured time-offset parameters may include a value such as $N_{PRS}$ or $N_{DRS}$, which may refer to a number of subframes in which the PRS or DRS should be repeated, respectively. Specifically, the $N_{PRS}$ may be referred to as "numDL-Frames" and have a value between 1, 2, 4, or 6, and indicate that the PRS should be repeated that number of frames. A similar name or value may be used for DRS transmission.

Figure 3:
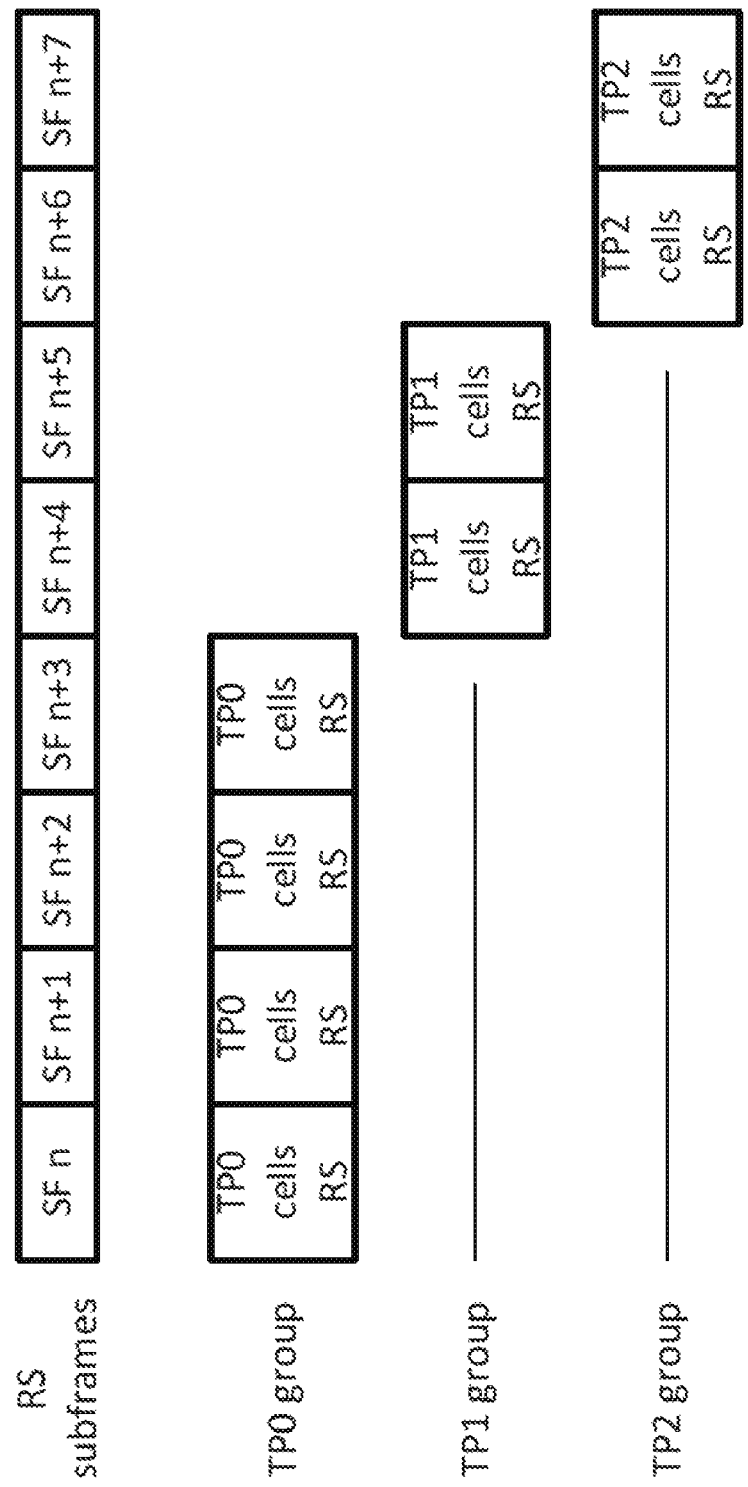
FIG. 3 illustrates an example of RS timing in a network such as the network of FIG. 2, in accordance with various embodiments.

FIG. 3 depicts an example of a subframe offset algorithm that may be used for transmitting RSs such as PRSs using the network-configured time-offset parameters described above. Specifically, in FIG. 3, the RSs may be transferred in a subframe of a radio frame such as SFn through SFn+7. As shown in FIG. 3, a first transmit station (or group of transmit stations) may be assigned to the group designated as TP0 group. The transmit stations in the TP0 group may transmit an RS in the first four subframes of the radio frame, that is, SFn through SFn+3. This configuration may be designated by, for example, an $I_{PRS}$ value of 0 and an $N_{PRS}$ value of 4, which may indicate that the TP0 group is to use the configuration indicated by the value of 0 and repeat transmission of the RS (in this case the PRS) for 4 subframes.

Transmit stations in the TP1 group may then transmit an RS such as a PRS for two subframes starting at subframe SFn+4. This configuration may be designated by, for example, an $I_{PRS}$ value of 4 and an $N_{PRS}$ value of 2, indicating that the TP0 group is to use the configuration indicated by the value of 4 and repeat transmission of the RS (in this case the PRS) for 2 subframes. Next, transmit stations in the TP2 group may then transmit an RS such as a PRS for two subframes starting at subframe SFn+6. This configuration may be designated by, for example, an $I_{PRS}$ value of 6 and an $N_{PRS}$ value of 2, indicating that the TP0 group is to use the configuration indicated by the value of 6 and repeat transmission of the RS (in this case the PRS) for 2 subframes.

As described above, the $I_{PRS}$ may be used to designate the number of subframes by which the RS transmission should be offset. However, in other embodiments the $I_{PRS}$ configuration index may designate a different value or affect the time offset of the RS differently. In the embodiments described above, the PRS is used as an example, but in other embodiments similar parameters or time offsets may be used for the DRS. Additionally, in some embodiments the values used (0, 4, or 6) for the $I_{PRS}$ may be different than the example above, and similarly the values used (4 or 2) for the $N_{PRS}$ may be different than the example above.

In some embodiments, the TP0, TP1, and/or TP2 group, or some other group of transmit stations, may include multiple transmit stations. For example, in some embodiments different transmit stations 205 may be identified as being in different clusters of the transmit stations 205. In some embodiments, the clusters may be based on geographic criteria or some other criteria, and have different PCIDs than one another. Each of the groups (TP0, TP1, and TP2) may include a transmit station from each cluster of transmit stations 205.

Muting Pattern

In some embodiments, a muting pattern may be used for RS transmission.

Specifically, a series of time instances or subframes may be designated for RS transmission by one or more transmit stations such as transmit stations 205. In these embodiments, one transmit station (or group of transmit stations from different clusters) may transmit in one of the time instances, while the other transmit stations do not transmit a signal.

Figure 4:
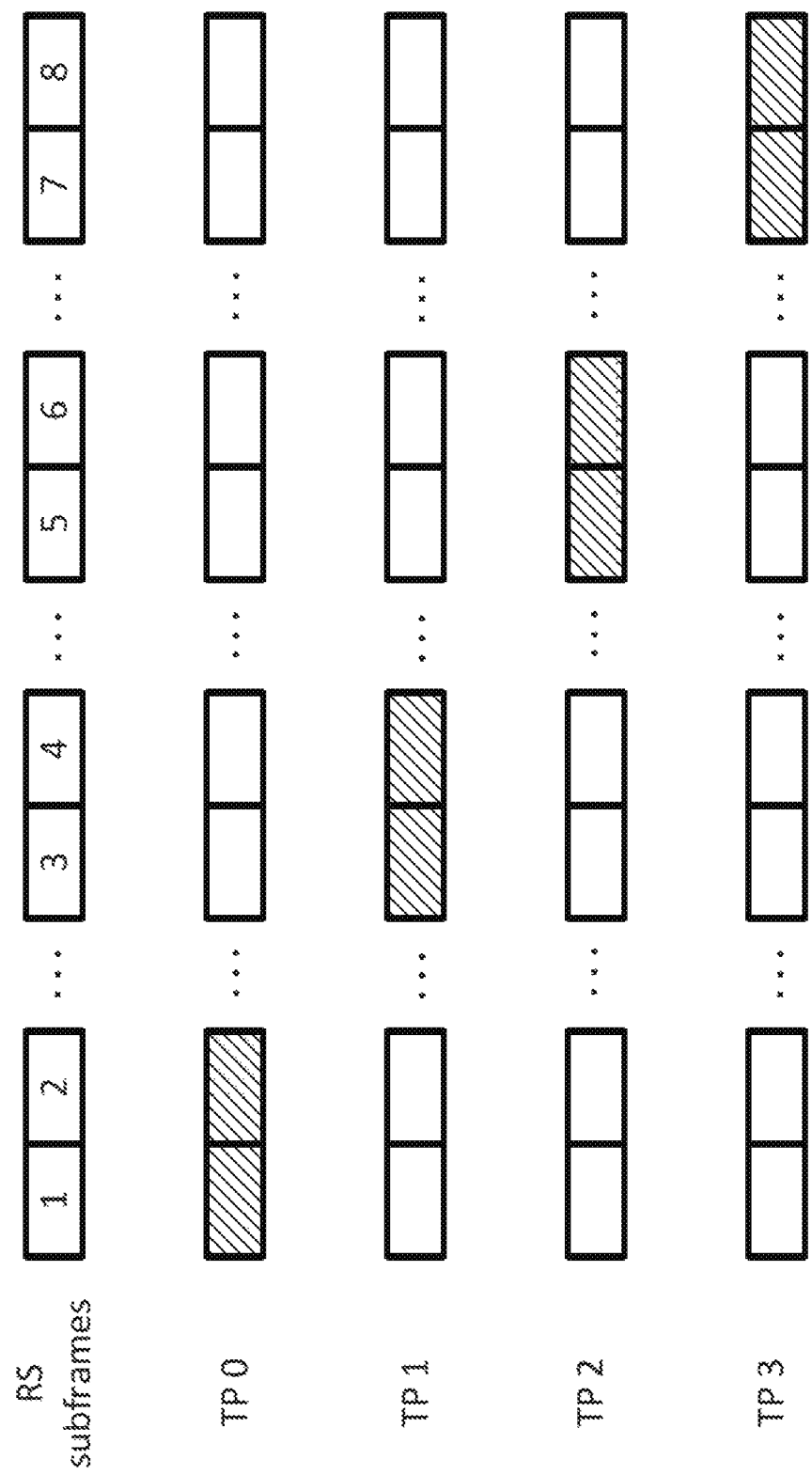
FIG. 4 illustrates an example of RS muting in a network such as the network of FIG. 2, in accordance with various embodiments.

FIG. 4 depicts an example of how a muting pattern may be used to transmit RSs in a network such as network 200. The example below will be described with respect to PRS, but in other embodiments a similar muting pattern may be used for DRS transmission or transmission of some other RS. Additionally, the example below will be described with respect to subframes that are designated for PRS transmission, however in other embodiments a different time instance may be used, such as an OFDM symbol, a radio frame, or a time slot within a subframe. In embodiments, the muting pattern may be a network-configured parameter, which may be considered a network-configured time-offset parameter, that is pre-provisioned in the various transmit stations or the UE 215, or included in a PRS-info message or some other network-provisioned message as described above. In other embodiments, the muting pattern may be a different type of network-configured parameter than a network-configured time-offset parameter. In some embodiments, the muting pattern may be indicated in a prs-MutingInfo-r9 field, which may be a 2-bit string, a 4-bit string, an 8-bit string, a 16-bit string, or some other size of string.

In the embodiments depicted in FIG. 4, each of the transmit stations TP0, TP1, TP2, and TP3 may have the same PRS configuration, e.g., $I_{PRS}$ may be equal to 0 for TP0, TP1, TP2, and TP3. The PRS configuration may indicate, for example, that the PRS transmission should have a PRS periodicity of 160 milliseconds (ms), and no PRS time instance offset. That is, $T_{PRS}$ may be equal to 160, and $\Delta_{PRS}$ may be equal to 0. In the embodiments of FIG. 4, $N_{PRS}$ may be equal to 2, indicating that the PRS is to be transmitted in two concurrent subframes. As shown in FIG. 4, eight subframes (number 1 through 8) may be designated for RS transmission. In embodiments, one or more of the subframes may be concurrent, while in other embodiments the subframes may be distributed differently than shown in FIG. 4.

In embodiments, the muting pattern for each transmit station 205 may be a network-configured parameter that is pre-provisioned in the various transmit stations or the UE 215, or included in a PRS-info message or some other network-provisioned message as described above. In some embodiments, the muting pattern may be indicated in a prs-MutingInfo-r9 field, which may be a 2-bit string, a 4-bit string, an 8-bit string, a 16-bit string, or some other size of string. As shown in FIG. 4, the muting pattern for TP0 may be "1 0 0 0," where the value of 1 indicates that the transmit station or stations associated with TP0 are to transmit an RS in the first two subframes as shown. The muting pattern for TP1 may be "0 1 0 0," where the value of 1 indicates that the transmit station or stations associated with TP1 are to transmit an RS in the second two subframes. Similarly, the muting pattern for TP2 may be "0 0 1 0," and the muting pattern for TP3 may be "0 0 0 1."

Upon receipt of a PRS from one of the transmit stations 205, the UE 215 may identify the subframe in which the PRS was transmitted. The UE 215 may then identify, based on the subframe, the muting pattern used to transmit the PRS. Based on the muting pattern, the UE 215 may identify which of the transmit stations 205 transmitted the PRS. The UE 215 may then perform an RSTD measurement and report both the RSTD measurement and the identity of the transmit station and/or the muting pattern used to the SMLC and/or the eNB 220. The SMLC and/or eNB 220 may then use the RSTD and the muting pattern or transmit station identity to perform an OTDOA measurement and identify the location of the UE 215. In some embodiments, the UE 215 may report both the indication of the muting pattern and a PRS-ConfigurationIndex ($I_{PRS}$) to the SMLC and/or eNB 220 so that a higher degree of freedom may be provided to the SMLC, which may result in increased scheduling flexibility.

VCID Solution

As noted above, RSs such as the PRS and/or DRS may be initialized in legacy systems based on $c_{init}$, which in turn may be based on the parameter $N_{ID}^{cell}$ as shown in equation 1, above. As described above, $N_{ID}^{cell}$ may be equivalent to the PCID associated with the various cells 210, which may result in the RSs of the cells 210 being identical to one another such that the UE 215 may not be able to identify which RS came from which of the cells 210.

In embodiments, the values of $N_{ID}^{cell}$ may be manipulated to generate unique RSs. Specifically, a cell 210 may utilize a VCID for RS scrambling and RE mapping that is different than the PCID. For example, cell 210a may have a different VCID than cell 210b, which may have a different VCID than cell 210c, etc. Specifically, in embodiments $N_{ID}^{cell}$ in equations 1 or 2 may be replaced by a VCID that may be referred to as $N_{PRS}^{cell}$ or $N_{ID}^{DRS}$ for PRS or DRS generation, respectively. In other words, the values $N_{PRS}^{cell}$ or $N_{ID}^{DRS}$ may be used to generate RS sequences or RE resource mappings that may be different for each cell 210.

In some embodiments, the value for $N_{ID}^{DRS}$ may be in a range of 0-503 for legacy systems (e.g., 504 different PCIDs may be available in the legacy systems). Therefore, to generate scrambling sequences for a DRS that may be backward compatible, a value such as $N_{ID}^{MAX}$, which may be equal to 504, may be added to the $N_{ID}^{DRS}$ for a given cell. That is, the $c_{init}$ value for a given cell may be defined as $c_{init} = 2^{10} \cdot (7 \cdot (n_s+1)+l+1) \cdot (2 \cdot (N_{ID}^{DRS}+N_{ID}^{MAX})+1)+2 \cdot (N_{ID}^{DRS}+N_{ID}^{MAX})+N_{CP}$ (hereinafter referred to as equation 3.)

In order to signal the VCID associated with a given cell 210, an LPP message as described above may deliver the VCID for both a reference cell and neighbor cells through elements such as "OTDOA-ReferenceCellInfo" and "OTDOA-NeighbourCellInfoElement," respectively. Specifically, the OTDOA-Reference Cell Info may be defined in pseudo-code as:

```
OTDOA-ReferenceCellInfo ::= SEQUENCE{
    physCellID          INTEGER (0..503),
    cellGlobalId        ECGI OPTIONAL,      --Need ON
    virtualCellID       INTEGER (0..503)    OPTIONAL
```

Similarly, the OTDOA-NeighbourCellInfoElement may be defined in pseudo-code as:

```
OTDOA- NeighbourCellInfoElement::= SEQUENCE{
    physCellID          INTEGER (0..503),
    cellGlobalId        ECGI OPTIONAL,      --Need ON
    virtualCellID       INTEGER (0..503)    OPTIONAL
```

A UE such as UE 215 that receives an LPP message may identify whether the virtualCellID element indicates a value to be used for the VCID and, if so, the UE 215 may use the VCID as a basis for RS sequence generation and/or RS RE allocation.

Alternatively, in some embodiments the Global Cell ID (designated as cellGlobalId in the examples above) may be used as a basis for RS sequence generation and/or RS RE allocation. Specifically, the Global Cell ID may be a value that is unique to each cell 210, and which may have a larger value than the PCID or VCID discussed above. Therefore, in some embodiments equations 1 and 2 may be used to generate RS sequences and RE allocation mappings, as discussed above, but physCellID or $N_{ID}^{cell}$ may be set equal to mod(cellGlobalId, 504) for each cell 210.

Figure 5:
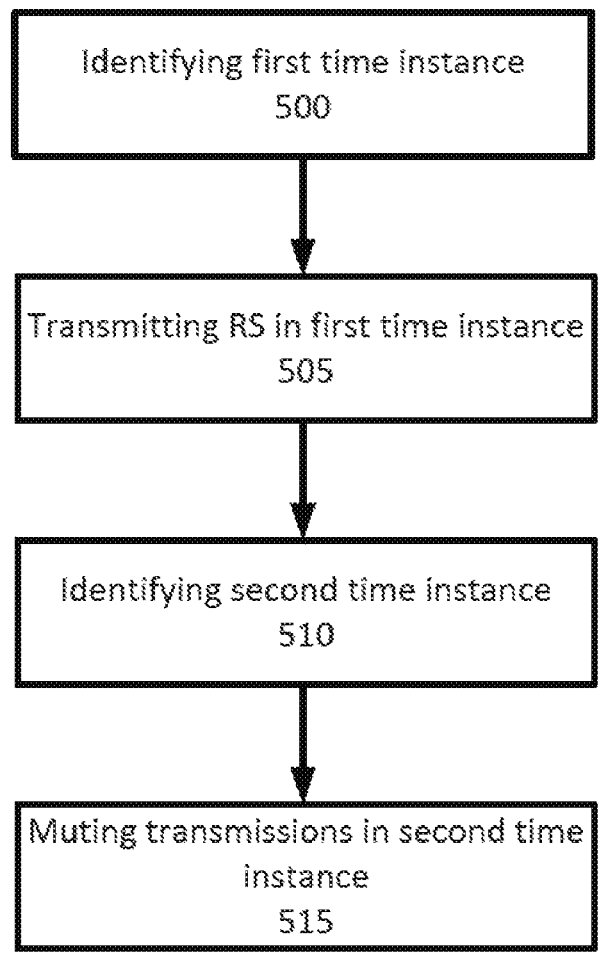
FIG. 5 illustrates an example process that may be performed by a transmit station of a network such as the network of FIG. 2, in accordance with various embodiments.

FIG. 5 depicts an example process that may be used by a transmit station such as one of transmit stations 205. Initially, the transmit station may identify at 500 a first time instance in which to transmit an RS. The time instance may be one of a plurality of time instances associated with RS transmission. The time instance may be identified based on a muting pattern related to the RS. In some embodiments, the RS may be a PRS, a DRS, or some other type of RS. The transmit station may transmit the RS in the identified time instance at 505.

The transmit station may then identify, based on the muting pattern, a second time instance from the plurality of time instances in which the transmit station should be muted at 510, and the transmit station may mute transmissions of the transmit station in the second time instance at 515.

Figure 6:
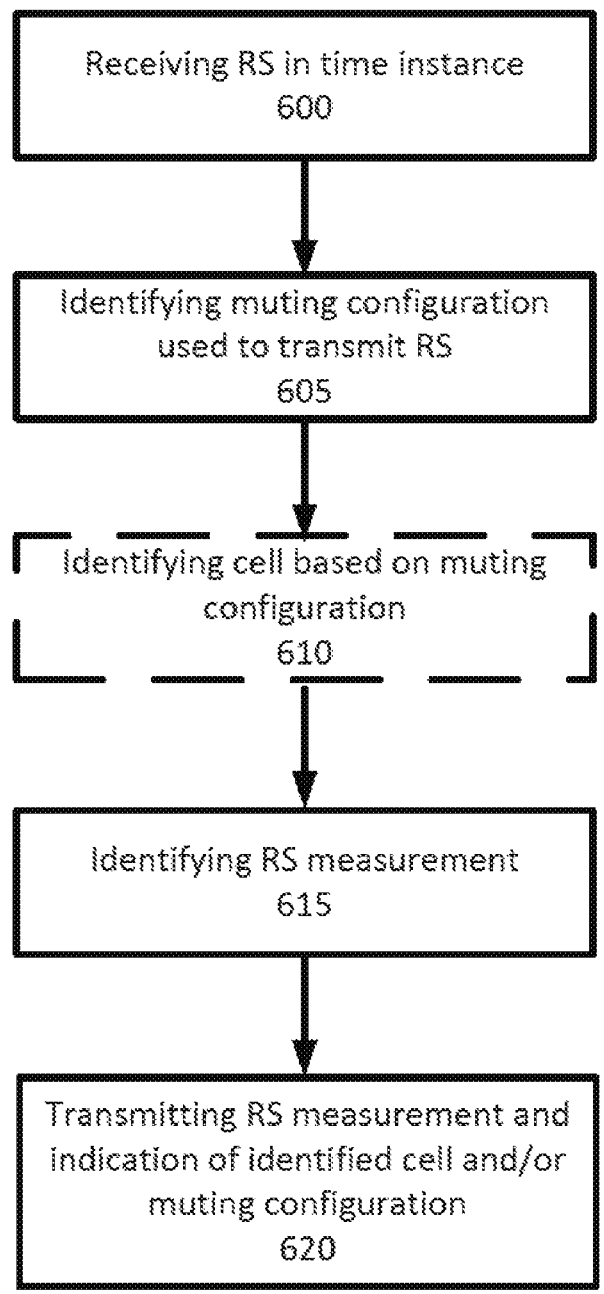
FIG. 6 illustrates an example process that may be performed by a UE of a network such as the network of FIG. 2, in accordance with various embodiments.

FIG. 6 depicts an example process that may be used by a UE such as UE 215. Initially, the UE 215 may receive an RS such as a PRS or a DRS in a time instance at 600. The UE 215 may then identify the muting configuration used to transmit the RS at 605. Based on the muting configuration, the UE 215 may optionally identify the cell that transmitted the RS at 610. Because the UE 215 may know the time at which the RS was sent and the identity and/or the location of the cell that sent the transmission, the UE 215 may then identify a measurement associated with the received RS at 615. In embodiments, the measurement may be an RSTD, an RRM measurement, or some other measurement. Finally, the UE 215 may transmit at 620 the RS measurement identified at 605 and an indication of the muting configuration and/or identification of the cell at 620.

Figure 7:
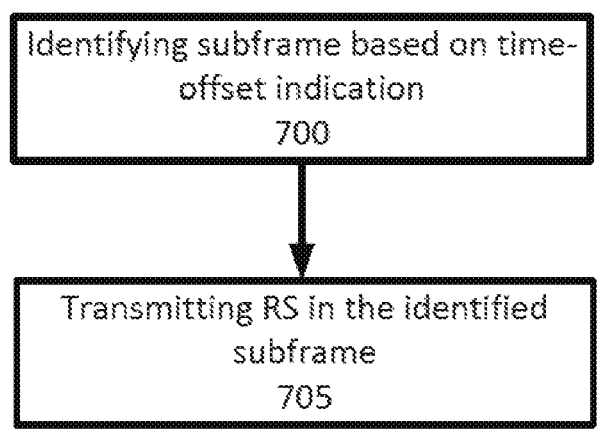
FIG. 7 illustrates an example process that may be performed by a transmit station of a network such as the network of FIG. 2, in accordance with various embodiments.

FIG. 7 depicts an alternative example process that may be used by a transmit station such as one of transmit stations 205. In embodiments, the transmit station may identify a subframe in which to transmit an RS such as a PRS or a DRS based on an indication of a time offset at 700. The indication of the time offset may include a configuration index, a periodicity indication, a number of subframes in which the RS is to be repeated, or some other parameter as described above. The transmit station may then transmit the RS in the identified subframe at 705.

Figure 8:
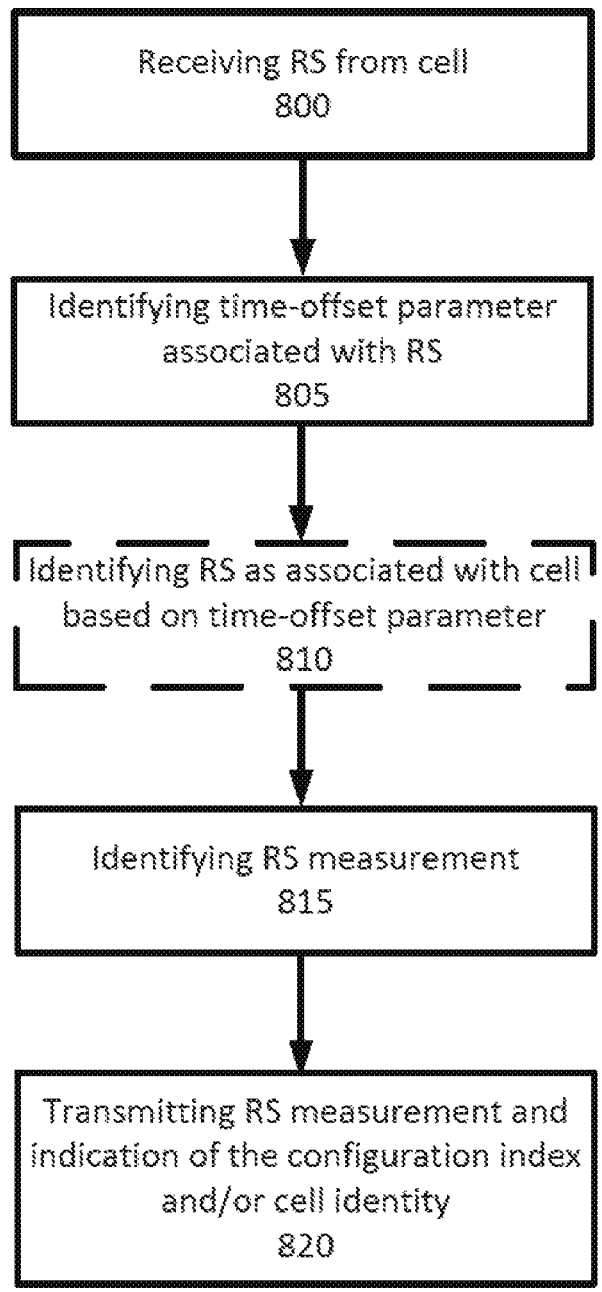
FIG. 8 illustrates an example process that may be performed by a UE of a network such as the network of FIG. 2, in accordance with various embodiments.

FIG. 8 depicts an alternative example process that may be used by a UE such as UE 215. In embodiments, the UE 215 may receive an RS from a cell such as one of cells 210 at 800. In embodiments the received RS may be a PRS, a DRS, or some other RS as described above. The UE may then identify a time-offset parameter associated with the RS at 805, as described above. Specifically, the time-offset parameter may indicate a time offset associated with the RS, as described above. Based on the identified time-offset parameter, the UE 215 may optionally identify the RS as associated with a particular one of the cells 210 at 810. The UE 215 may then identify an RS measurement related to the received RS at 815, as described above. Specifically, because the UE 215 may know the identity and/or geographic position of the cell that transmitted the RS, or the time of transmission of the RS, the RS measurement may include, for example, an RSTD measurement, a RRM measurement, or some other measurement as described above. The UE 215 may then transmit the RS measurement identified at 805, the configuration index identified at 810, and the cell identity optionally identified at 815 at 820.

Figure 9:
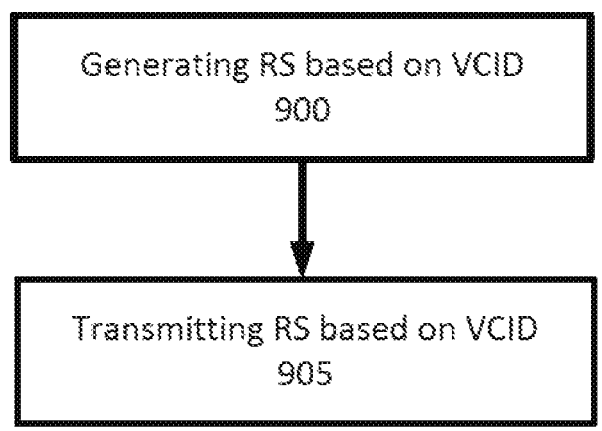
FIG. 9 illustrates an example process that may be performed by a transmit station of a network such as the network of FIG. 2, in accordance with various embodiments.

FIG. 9 depicts an alternative example process that may be used by a transmit station such as one of transmit stations 205. Specifically, the transmit station may generate an RS such as a PRS, a DRS, or some other type of RS based on a VCID at 900. The transmit station may then transmit the generated RS at 905.

Figure 10:
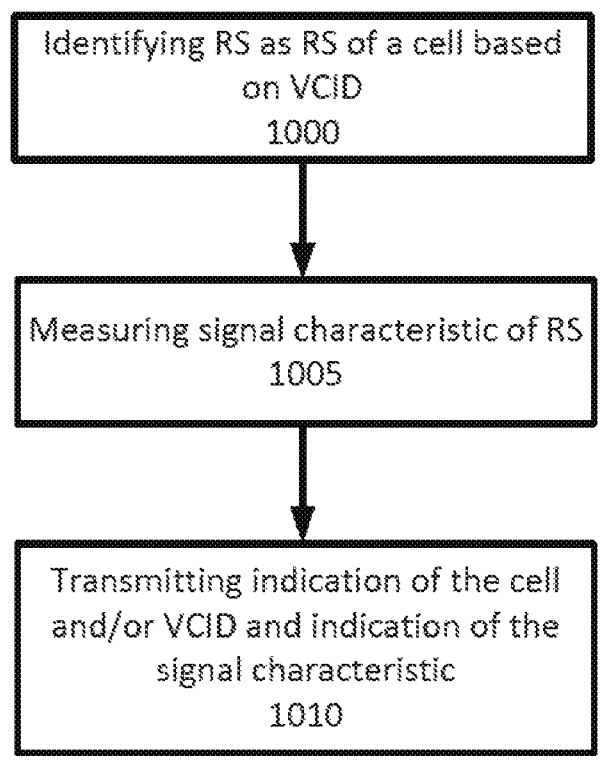
FIG. 10 illustrates an example process that may be performed by a UE of a network such as the network of FIG. 2, in accordance with various embodiments.

FIG. 10 depicts an alternative example process that may be used by a UE such as UE 215. Specifically, the UE 215 may receive an RS such as a PRS, a DRS, or some other type of RS, and identify the RS as an RS of a specific cell 210 of the network 200 based on the VCID used to generate the RS at 1000. Specifically, the UE 215 may receive the RS and an indication of the VCIDs that may be used by the network 200, as well as which cell is associated with which VCID. Alternatively, the UE 215 may be pre-provisioned with the various VCIDs and the association between the VCIDs and the UE 215. In embodiments, the UE 215 may be configured to generate an RS parameter such as the $c_{init}$ or $v_{shift}$ parameters described above using the various VCIDs. If the UE 215 is able to generate an RS, or an RE mapping, that corresponds to the received RS using one of the VCIDs, then the UE 215 may be able to identify the cell that transmitted the RS.

Because the UE 215 may know the identity and/or geographic location of the cell that transmitted the RS, the UE 215 may then measure one or more signal characteristics of the RS such as the RSTD, the RRM, or some other characteristic at 1005, as described above. Finally, the UE 215 may transmit an indication of the cell that transmitted the RS and/or an indication of the VCID associated with the RS, as well as the measured signal characteristic, at 1010.

Figure 11:
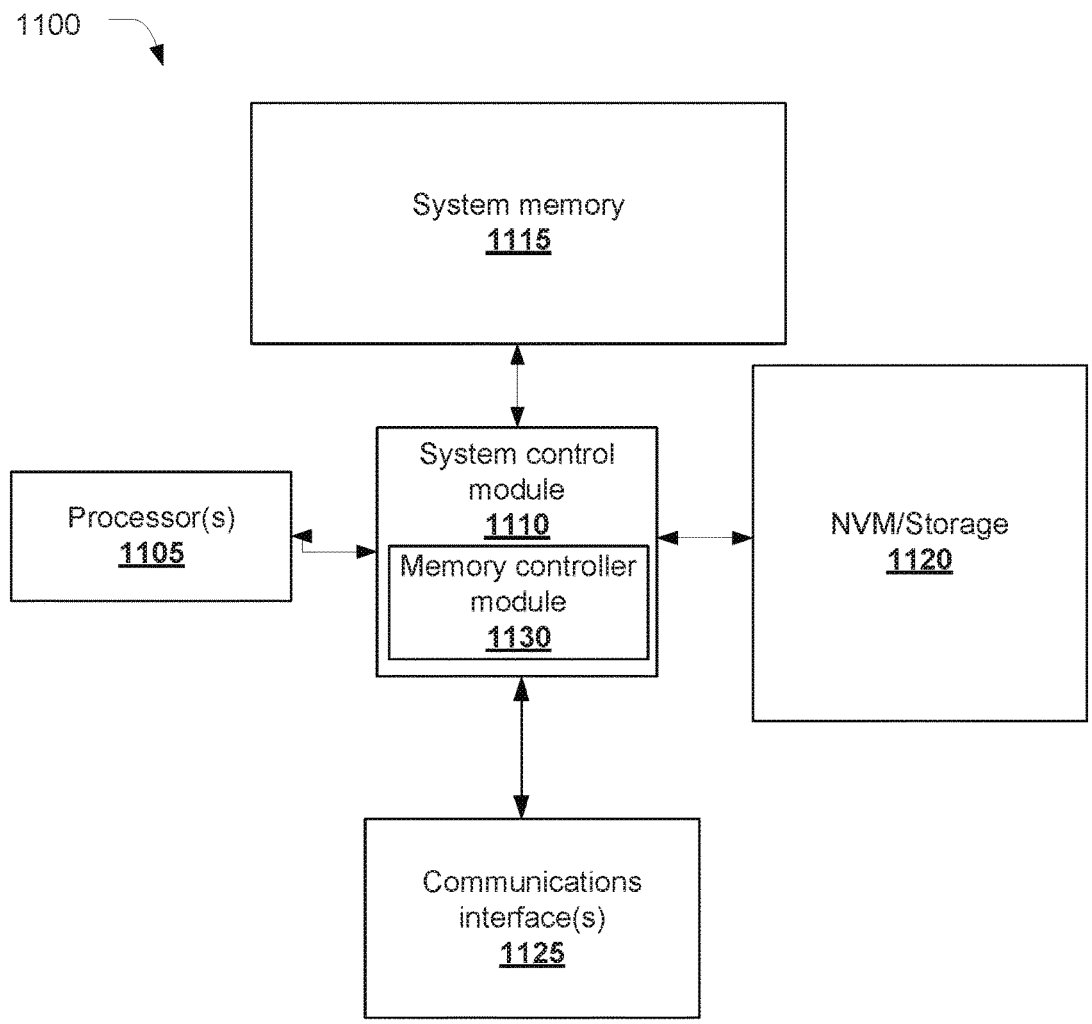
FIG. 11 schematically illustrates an example system that may be used to practice various embodiments described herein.

Embodiments of the present disclosure may be implemented into a system using any suitable hardware and/or software to configure as desired. FIG. 11 schematically illustrates an example system 1100 that may be used to practice various embodiments described herein. FIG. 11 illustrates, for one embodiment, an example system 1100 having one or more processor(s) 1105, system control module 1110 coupled to at least one of the processor(s) 1105, system memory 1115 coupled to system control module 1110, non-volatile memory (NVM)/storage 1120 coupled to system control module 1110, and one or more communications interface(s) 1125 coupled to system control module 1110.

In some embodiments, the system 1100 may be capable of functioning as the UE 110 or 215 as described herein. In other embodiments, the system 1100 may be capable of functioning as transmit station 105, eNB 220, or one of transmit stations 205 as described herein. In some embodiments, the system 1100 may include one or more computer-readable media (e.g., system memory 1115 or NVM/storage 1120) having instructions and one or more processors (e.g., processor(s) 1105) coupled with the one or more computer-readable media and configured to execute the instructions to implement a module to perform actions described herein.

System control module 1110 for one embodiment may include any suitable interface controllers to provide for any suitable interface to at least one of the processor(s) 1105 and/or to any suitable device or component in communication with system control module 1110.

System control module 1110 may include memory controller module 1130 to provide an interface to system memory 1115. The memory controller module 1130 may be a hardware module, a software module, and/or a firmware module.

System memory 1115 may be used to load and store data and/or instructions, for example, for system 1100. System memory 1115 for one embodiment may include any suitable volatile memory, such as suitable dynamic random access memory (DRAM), for example. In some embodiments, the system memory 1115 may include double data rate type four synchronous dynamic random-access memory (DDR4 SDRAM).

System control module 1110 for one embodiment may include one or more input/output (I/O) controller(s) to provide an interface to NVM/storage 1120 and communications interface(s) 1125.

The NVM/storage 1120 may be used to store data and/or instructions, for example. NVM/storage 1120 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 1120 may include a storage resource physically part of a device on which the system 1100 may be installed or it may be accessible by, but not necessarily a part of, the device. For example, the NVM/storage 1120 may be accessed over a network via the communications interface(s) 1125.

Communications interface(s) 1125 may provide an interface for system 1100 to communicate over one or more network(s) and/or with any other suitable device. The system 1100 may wirelessly communicate with the one or more components of the wireless network in accordance with any of one or more wireless network standards and/or protocols. In some embodiments the communications interface(s) 1125 may include the transceiver modules 130 or 150.

For one embodiment, at least one of the processor(s) 1105 may be packaged together with logic for one or more controller(s) of system control module 1110, e.g., memory controller module 1130. For one embodiment, at least one of the processor(s) 1105 may be packaged together with logic for one or more controllers of system control module 1110 to form a System in Package (SiP). For one embodiment, at least one of the processor(s) 1105 may be integrated on the same die with logic for one or more controller(s) of system control module 1110. For one embodiment, at least one of the processor(s) 1105 may be integrated on the same die with logic for one or more controller(s) of system control module 1110 to form a System on Chip (SoC).

In some embodiments the processor(s) 1105 may include or otherwise be coupled with one or more of a graphics processor (GPU) (not shown), a digital signal processor (DSP) (not shown), wireless modem (not shown), digital camera or multimedia circuitry (not shown), sensor circuitry (not shown), display circuitry (not shown), and/or global positioning satellite (GPS) circuitry (not shown).

In various embodiments, the system 1100 may be, but is not limited to, a server, a workstation, a desktop computing device, or a mobile computing device (e.g., a laptop computing device, a handheld computing device, a tablet, a netbook, a smartphone, a gaming console, etc.). In various embodiments, the system 1100 may have more or fewer components, and/or different architectures. For example, in some embodiments, the system 1100 includes one or more of a camera, a keyboard, liquid crystal display (LCD) screen (including touch screen displays), non-volatile memory port, multiple antennas, graphics chip, application-specific integrated circuit (ASIC), and speakers.

EXAMPLES

Example 1 may include a method comprising: identifying, by a first cell of a cellular network that includes a plurality of cells, wherein cells in the plurality of cells have a same physical cell identifier (PCID) as one another, based on an indication of a muting pattern related to a discovery reference signal (DRS) transmission, a first time instance associated with DRS transmission in which the first cell is to transmit a DRS; transmitting, by the first cell, the DRS in the first time instance; identifying, by the first cell based on the indication of the muting pattern, a second time instance associated with DRS transmission in which the first cell is to be muted; and muting, by the first cell, transmissions of the first cell in the second time instance.

Example 2 may include the method of example 1, wherein the DRS is based on a physical cell identifier (PCID) associated with the first cell.

Example 3 may include the method of example 1, wherein the first cell and a second cell in the plurality of cells are cells of a coordinated multi point (CoMP) network.

Example 4 may include the method of example 1, wherein the DRS is a first DRS, and the muting pattern includes an indication that a second cell of the cellular network is to be muted during the first time instance and the second cell is to transmit a second DRS in the second time instance.

Example 5 may include the method of any of examples 1-4, wherein the first time instance and the second time instance are respective subframes of a radio frame.

Example 6 may include the method of any of examples 1-4, wherein the time instance includes more than one subframe.

Example 7 may include one or more non-transitory computer-readable media comprising instructions to cause a transmit station of a first cell of a cellular network that includes a plurality of cells, wherein cells in the plurality of cells have a same physical cell identifier (PCID) as one another, upon execution of the instructions by one or more processors of the transmit station, to: identify, based on an indication of a muting pattern related to a discovery reference signal (DRS) transmission, a first time instance associated with DRS transmission in which the first cell is to transmit a DRS; transmit the DRS in the first time instance; identify, based on the indication of the muting pattern, a second time instance associated with DRS transmission in which the first cell is to be muted; and mute transmissions of the first cell in the second time instance.

Example 8 may include the one or more non-transitory computer-readable media of example 7, wherein the DRS is based on a physical cell identifier (PCID) associated with the first cell.

Example 9 may include the one or more non-transitory computer-readable media of example 7, wherein the first cell and a second cell in the plurality of cells are cells of a coordinated multi point (CoMP) network.

Example 10 may include the one or more non-transitory computer-readable media of example 7, wherein the DRS is a first DRS, and the muting pattern includes an indication that a second cell of the cellular network is to be muted during the first time instance and the second cell is to transmit a second DRS in the second time instance.

Example 11 may include the one or more non-transitory computer-readable media of any of examples 7-10, wherein the first time instance and the second time instance are respective subframes of a radio frame.

Example 12 may include the one or more non-transitory computer-readable media of any of examples 7-10, wherein the time instance includes more than one subframe.

Example 13 may include a transmit station of a first cell of a cellular network that includes a plurality of cells, wherein cells in the plurality of cells have a same physical cell identifier (PCID) as one another, the transmit station comprising: means to identify, based on an indication of a muting pattern related to a discovery reference signal (DRS) transmission, a first time instance associated with DRS transmission in which the first cell is to transmit a DRS; means to transmit the DRS in the first time instance; means to identify, based on the indication of the muting pattern, a second time instance associated with DRS transmission in which the first cell is to be muted; and means to mute transmissions of the first cell in the second time instance.

Example 14 may include the transmit station of example 13, wherein the DRS is based on a physical cell identifier (PCID) associated with the first cell.

Example 15 may include the transmit station of example 13, wherein the first cell and a second cell in the plurality of cells are cells of a coordinated multi point (CoMP) network.

Example 16 may include the transmit station of example 13, wherein the DRS is a first DRS, and the muting pattern includes an indication that a second cell of the cellular network is to be muted during the first time instance and the second cell is to transmit a second DRS in the second time instance.

Example 17 may include the transmit station of any of examples 13-16, wherein the first time instance and the second time instance are respective subframes of a radio frame.

Example 18 may include the transmit station of any of examples 13-16, wherein the time instance includes more than one subframe.

Example 19 may include a transmit station of a first cell of a cellular network that includes a plurality of cells, wherein cells in the plurality of cells have a same physical cell identifier (PCID) as one another, the transmit station comprising: reference signal (RS) circuitry to: identify, based on an indication of a muting pattern related to a discovery reference signal (DRS) transmission, a first time instance associated with DRS transmission in which the first cell is to transmit a DRS; and identify, based on the indication of the muting pattern, a second time instance associated with DRS transmission in which the first cell is to be muted; and transmit circuitry coupled with the control circuitry, the transmit circuitry to: transmit the DRS in the first time instance; and mute transmissions of the first cell in the second time instance.

Example 20 may include the transmit station of example 19, wherein the DRS is based on a physical cell identifier (PCID) associated with the first cell.

Example 21 may include the transmit station of example 19, wherein the first cell and a second cell in the plurality of cells are cells of a coordinated multi point (CoMP) network.

Example 22 may include the transmit station of example 19, wherein the DRS is a first DRS, and the muting pattern includes an indication that a second cell of the cellular network is to be muted during the first time instance and the second cell is to transmit a second DRS in the second time instance.

Example 23 may include the transmit station of any of examples 19-22, wherein the first time instance and the second time instance are respective subframes of a radio frame.

Example 24 may include the transmit station of any of examples 19-22, wherein the time instance includes more than one subframe.

Example 25 may include a user equipment (UE) in a cellular network that includes a plurality of cells, the UE comprising: receive circuitry to receive a reference signal (RS) and a time instance associated with RS transmission; RS measurement circuitry coupled with the receive circuitry, the RS measurement circuitry to: identify, based on a muting configuration, the RS as an RS associated with a cell of the plurality of cells; and identify, based on the muting configuration, an RS measurement related to the received RS; and transmit circuitry coupled with the RS measurement circuitry, the transmit circuitry to transmit, to an evolved NodeB (eNB), the RS measurement and an indication of the identified cell.

Example 26 may include the UE of example 25, wherein the RS is a positioning RS (PRS) or a discovery RS (DRS).

Example 27 may include the UE of example 25, wherein the RS measurement is a reference signal time difference (RSTD) or a measurement related to radio resource management (RRM).

Example 28 may include the UE of any of examples 25-27, wherein the cellular network is a coordinated multi point (CoMP) cellular network.

Example 29 may include the UE of any of examples 25-27, wherein the UE further comprises a baseband processor coupled with the receive circuitry.

Example 30 may include the UE of any of examples 25-27, wherein the time instance is a subframe of a radio frame or a unit of the subframe.

Example 31 may include the UE of any of examples 25-27, wherein the indication of the identified cell is an indication of a muting pattern associated with the identified cell.

Example 32 may include the UE of any of examples 25-27, wherein the RS is based on a physical cell identifier (PCID) of the cell.

Example 33 may include a method comprising: receiving, by a user equipment (UE) in a cellular network that includes a plurality of cells, a reference signal (RS) and a time instance associated with RS transmission; identifying, by the UE based on a muting configuration, the RS as an RS associated with a cell of the plurality of cells; identifying, by the UE based on the muting configuration, an RS measurement related to the received RS; and transmitting, by the UE to an evolved NodeB (eNB), the RS measurement and an indication of the identified cell.

Example 34 may include the method of example 33, wherein the RS is a positioning RS (PRS) or a discovery RS (DRS).

Example 35 may include the method of example 33, wherein the RS measurement is a reference signal time difference (RSTD) or a measurement related to radio resource management (RRM).

Example 36 may include the method of any of examples 33-35, wherein the cellular network is a coordinated multi point (CoMP) cellular network.

Example 37 may include the method of any of examples 33-35, wherein the time instance is a subframe of a radio frame or a unit of the subframe.

Example 38 may include the method of any of examples 33-35, wherein the indication of the identified cell is an indication of a muting pattern associated with the identified cell.

Example 39 may include the method of any of examples 33-35, wherein the RS is based on a physical cell identifier (PCID) of the cell.

Example 40 may include one or more non-transitory computer-readable media comprising instructions to cause a user equipment (UE) in a cellular network that includes a plurality of cells, upon execution of the instructions by one or more processors of the UE, to: receive a reference signal (RS) and a time instance associated with RS transmission; identify, based on a muting configuration, the RS as an RS associated with a cell of the plurality of cells; identify, based on the muting configuration, an RS measurement related to the received RS; and transmit, to an evolved NodeB (eNB), the RS measurement and an indication of the identified cell.

Example 41 may include the one or more non-transitory computer-readable media of example 40, wherein the RS is a positioning RS (PRS) or a discovery RS (DRS).

Example 42 may include the one or more non-transitory computer-readable media of example 40, wherein the RS measurement is a reference signal time difference (RSTD) or a measurement related to radio resource management (RRM).

Example 43 may include the one or more non-transitory computer-readable media of any of examples 40-42, wherein the cellular network is a coordinated multi point (CoMP) cellular network.

Example 44 may include the one or more non-transitory computer-readable media of any of examples 40-42, wherein the time instance is a subframe of a radio frame or a unit of the subframe.

Example 45 may include the one or more non-transitory computer-readable media of any of examples 40-42, wherein the indication of the identified cell is an indication of a muting pattern associated with the identified cell.

Example 46 may include the one or more non-transitory computer-readable media of any of examples 40-42, wherein the RS is based on a physical cell identifier (PCID) of the cell.

Example 47 may include a user equipment (UE) in a cellular network that includes a plurality of cells, the UE comprising: means to receive a reference signal (RS) and a time instance associated with RS transmission; means to identify, based on a muting configuration, the RS as an RS associated with a cell of the plurality of cells; means to identify, based on the muting configuration, an RS measurement related to the received RS; and means to transmit, to an evolved NodeB (eNB), the RS measurement and an indication of the identified cell.

Example 48 may include the UE of example 47, wherein the RS is a positioning RS (PRS) or a discovery RS (DRS).

Example 49 may include the UE of example 47, wherein the RS measurement is a reference signal time difference (RSTD) or a measurement related to radio resource management (RRM).

Example 50 may include the UE of any of examples 47-49, wherein the cellular network is a coordinated multi point (CoMP) cellular network.

Example 51 may include the UE of any of examples 47-49, wherein the time instance is a subframe of a radio frame or a unit of the subframe.

Example 52 may include the UE of any of examples 47-49, wherein the indication of the identified cell is an indication of a muting pattern associated with the identified cell.

Example 53 may include the UE of any of examples 47-49, wherein the RS is based on a physical cell identifier (PCID) of the cell.

Example 54 may include a transmit station of a cell of a cellular network, the transmit station comprising: reference signal (RS) circuitry to identify, based on an indication of a discovery RS (DRS) time instance offset, a time instance in which the transmit station is to transmit a DRS; and transmit circuitry coupled with the RS circuitry, the transmit circuitry to transmit the DRS in the time instance.

Example 55 may include the transmit station of example 54, wherein the time instance is an orthogonal frequency division multiplexing (OFDM) symbol, a time slot of a subframe, a subframe, or a radio frame.

Example 56 may include the transmit station of examples 54 or 55, wherein the DRS is based on a physical cell identifier (PCID) of the transmit station.

Example 57 may include the transmit station of examples 54 or 55, wherein the DRS is a channel state information RS (CSI-RS).

Example 58 may include the transmit station of examples 54 or 55, wherein the cell is a cell of a coordinated multi point (CoMP) network.

Example 59 may include the transmit station of examples 54 or 55, wherein the transmit station is a transmit point (TP) of the cellular network or a remote radio head (RRH) of the cellular network.

Example 60 may include a method comprising: identifying, by a transmit station of a cell of a cellular network, based on an indication of a discovery RS (DRS) time instance offset, a time instance in which the transmit station is to transmit a DRS; and transmitting, by the transmit station, the DRS in the time instance.

Example 61 may include the method of example 60, wherein the time instance is an orthogonal frequency division multiplexing (OFDM) symbol, a time slot of a subframe, a subframe, or a radio frame.

Example 62 may include the method of examples 60 or 61, wherein the DRS is based on a physical cell identifier (PCID) of the transmit station.

Example 63 may include the method of examples 60 or 61, wherein the DRS is a channel state information RS (CSI-RS).

Example 64 may include the method of examples 60 or 61, wherein the cell is a cell of a coordinated multi point (CoMP) network.

Example 65 may include the method of examples 60 or 61, wherein the transmit station is a transmit point (TP) of the cellular network or a remote radio head (RRH) of the cellular network.

Example 66 may include one or more non-transitory computer-readable media comprising instructions to cause a transmit station of a cell of a cellular network, upon execution of the instructions by one or more processors of the transmit station, to: identify, based on an indication of a discovery RS (DRS) time instance offset, a time instance in which the transmit station is to transmit a DRS; and transmit the DRS in the time instance.

Example 67 may include the one or more non-transitory computer-readable media of example 66, wherein the time instance is an orthogonal frequency division multiplexing (OFDM) symbol, a time slot of a subframe, a subframe, or a radio frame.

Example 68 may include the one or more non-transitory computer-readable media of examples 66 or 67, wherein the DRS is based on a physical cell identifier (PCID) of the transmit station.

Example 69 may include the one or more non-transitory computer-readable media of examples 66 or 67, wherein the DRS is a channel state information RS (CSI-RS).

Example 70 may include the one or more non-transitory computer-readable media of examples 66 or 67, wherein the cell is a cell of a coordinated multi point (CoMP) network.

Example 71 may include the one or more non-transitory computer-readable media of examples 66 or 67, wherein the transmit station is a transmit point (TP) of the cellular network or a remote radio head (RRH) of the cellular network.

Example 72 may include a transmit station of a cell of a cellular network, the transmit station comprising: means to identify, based on an indication of a discovery RS (DRS)

time instance offset, a time instance in which the transmit station is to transmit a DRS; and means to transmit the DRS in the time instance.

Example 73 may include the transmit station of example 72, wherein the time instance is an orthogonal frequency division multiplexing (OFDM) symbol, a time slot of a subframe, a subframe, or a radio frame.

Example 74 may include the transmit station of examples 72 or 73, wherein the DRS is based on a physical cell identifier (PCID) of the transmit station.

Example 75 may include the transmit station of examples 72 or 73, wherein the DRS is a channel state information RS (CSI-RS).

Example 76 may include the transmit station of examples 72 or 73, wherein the cell is a cell of a coordinated multi point (CoMP) network.

Example 77 may include the transmit station of examples 72 or 73, wherein the transmit station is a transmit point (TP) of the cellular network or a remote radio head (RRH) of the cellular network.

Example 78 may include one or more non-transitory computer-readable media comprising instructions to cause a user equipment (UE) in a cellular network, upon execution of the instructions by one or more processors of the UE, to: receive a reference signal (RS) from a cell in the cellular network; identify a network-configured time-offset parameter associated with the RS; identify, based on the network-configured time-offset parameter, an RS measurement related to the received RS; and transmit, to an evolved NodeB (eNB), the RS measurement and an indication of the network-configured time-offset parameter.

Example 79 may include the one or more non-transitory computer-readable media of example 78, wherein the RS is a positioning RS (PRS) or a discovery RS (DRS).

Example 80 may include the one or more non-transitory computer-readable media of examples 78 or 79, wherein the RS measurement is a reference signal time difference (RSTD) or a measurement related to radio resource management (RRM).

Example 81 may include the one or more non-transitory computer-readable media of examples 78 or 79, wherein the cellular network is a coordinated multi point (CoMP) cellular network.

Example 82 may include the one or more non-transitory computer-readable media of examples 78 or 79, wherein the network-configured time-offset parameter includes an RS configuration index, an indication of an RS periodicity, an indication of RS time instance offset, or an indication of a channel state information (CSI) RS configuration.

Example 83 may include the one or more non-transitory computer-readable media of example 82, wherein the RS periodicity is 1, 2, 4, or 6 subframes.

Example 84 may include the one or more non-transitory computer-readable media of examples 78 or 79, wherein the RS is based on a physical cell identifier (PCID) of the cell.

Example 85 may include a method comprising: receiving, by a user equipment (UE) in a cellular network, a reference signal (RS) from a cell in the cellular network; identifying, by the UE, a network-configured time-offset parameter associated with the RS; identifying, by the UE based on the network-configured time-offset parameter, an RS measurement related to the received RS; and transmitting, by the UE to an evolved NodeB (eNB), the RS measurement and an indication of the network-configured time-offset parameter.

Example 86 may include the method of example 85, wherein the RS is a positioning RS (PRS) or a discovery RS (DRS).

Example 87 may include the method of examples 85 or 86, wherein the RS measurement is a reference signal time difference (RSTD) or a measurement related to radio resource management (RRM).

Example 88 may include the method of examples 85 or 86, wherein the cellular network is a coordinated multi point (CoMP) cellular network.

Example 89 may include the method of examples 85 or 86, wherein the network-configured time-offset parameter includes an RS configuration index, an indication of an RS periodicity, an indication of RS time instance offset, or an indication of a channel state information (CSI) RS configuration.

Example 90 may include the method of example 89, wherein the RS periodicity is 1, 2, 4, or 6 subframes.

Example 91 may include the method of examples 85 or 86, wherein the RS is based on a physical cell identifier (PCID) of the cell.

Example 92 may include a user equipment (UE) in a cellular network, the UE comprising: means to receive a reference signal (RS) from a cell in the cellular network; means to identify a network-configured time-offset parameter associated with the RS; means to identify, based on the network-configured time-offset parameter, an RS measurement related to the received RS; and means to transmit, to an evolved NodeB (eNB), the RS measurement and an indication of the network-configured time-offset parameter.

Example 93 may include the UE of example 92, wherein the RS is a positioning RS (PRS) or a discovery RS (DRS).

Example 94 may include the UE of examples 92 or 93, wherein the RS measurement is a reference signal time difference (RSTD) or a measurement related to radio resource management (RRM).

Example 95 may include the UE of examples 92 or 93, wherein the cellular network is a coordinated multi point (CoMP) cellular network.

Example 96 may include the UE of examples 92 or 93, wherein the network-configured time-offset parameter includes an RS configuration index, an indication of an RS periodicity, an indication of RS time instance offset, or an indication of a channel state information (CSI) RS configuration.

Example 97 may include the UE of example 96, wherein the RS periodicity is 1, 2, 4, or 6 subframes.

Example 98 may include the UE of examples 92 or 93, wherein the RS is based on a physical cell identifier (PCID) of the cell.

Example 99 may include a user equipment (UE) in a cellular network, the UE comprising: receive circuitry to receive a reference signal (RS) from a cell in the cellular network; RS measurement circuitry coupled with the receive circuitry, the RS measurement circuitry to: identify a network-configured time-offset parameter associated with the RS; and identify, based on the network-configured time-offset parameter, an RS measurement related to the received RS; and transmit circuitry coupled with the RS measurement circuitry, the transmit circuitry to transmit, to an evolved NodeB (eNB), the RS measurement and an indication of the network-configured time-offset parameter.

Example 100 may include the UE of example 99, wherein the RS is a positioning RS (PRS) or a discovery RS (DRS).

Example 101 may include the UE of examples 99 or 100, wherein the RS measurement is a reference signal time difference (RSTD) or a measurement related to radio resource management (RRM).

Example 102 may include the UE of examples 99 or 100, wherein the cellular network is a coordinated multi point (CoMP) cellular network.

Example 103 may include the UE of examples 99 or 100, wherein the network-configured time-offset parameter includes an RS configuration index, an indication of an RS periodicity, an indication of RS time instance offset, or an indication of a channel state information (CSI) RS configuration.

Example 104 may include the UE of example 103, wherein the RS periodicity is 1, 2, 4, or 6 subframes.

Example 105 may include the UE of examples 99 or 100, wherein the RS is based on a physical cell identifier (PCID) of the cell.

Example 106 may include a method comprising: generating, by a cell based on a virtual cell identifier (VCID) associated with the cell that is different than a physical cell identifier (PCID) associated with the cell, a parameter of a reference signal (RS); and transmitting, by the cell, a RS based on the parameter and the VCID to a user equipment (UE) in the cellular network.

Example 107 may include the method of example 106, wherein the RS is a positioning RS (PRS) or a discovery RS (DRS).

Example 108 may include the method of example 106, further comprising generating the RS based on a pseudo-random sequence based on the VCID.

Example 109 may include the method of example 106, wherein the PCID is the same as a PCID of another cell of the cellular network, and the VCID is different than a VCID associated with the another cell.

Example 110 may include the method of example 106, wherein the cellular network is a coordinated multi point (COMP) cellular network.

Example 111 may include the method of example 106, wherein the parameter is a sequence associated with the RS or a resource element mapping associated with the RS.

Example 112 may include a transmit station of a cell in a wireless network, the transmit station comprising: means to generate, based on a virtual cell identifier (VCID) associated with the cell that is different than a physical cell identifier (PCID) associated with the cell, a parameter of a reference signal (RS); and means to transmit a RS based on the parameter and the VCID to a user equipment (UE) in the cellular network.

Example 113 may include the transmit station of example 112, wherein the RS is a positioning RS (PRS) or a discovery RS (DRS).

Example 114 may include the transmit station of example 112, further comprising means to generate the RS based on a pseudo-random sequence based on the VCID.

Example 115 may include the transmit station of any of examples 112-114, wherein the PCID is the same as a PCID of another cell of the cellular network, and the VCID is different than a VCID associated with the another cell.

Example 116 may include the transmit station of any of examples 112-114, wherein the cellular network is a coordinated multi point (COMP) cellular network.

Example 117 may include the transmit station of any of examples 112-114, wherein the parameter is a sequence associated with the RS or a resource element mapping associated with the RS.

Example 118 may include one or more non-transitory computer-readable media comprising instructions to cause a transmit station of a cell in a wireless network, upon execution of the instructions by one or more processors of the transmit station, to: generate, based on a virtual cell identifier (VCID) associated with the cell that is different than a physical cell identifier (PCID) associated with the cell, a parameter of a reference signal (RS); and transmit a RS based on the parameter and the VCID to a user equipment (UE) in the cellular network.

Example 119 may include the one or more non-transitory computer-readable media of example 118, wherein the RS is a positioning RS (PRS) or a discovery RS (DRS).

Example 120 may include the one or more non-transitory computer-readable media of example 118, wherein the instructions are further to generate the RS based on a pseudo-random sequence based on the VCID.

Example 121 may include the one or more non-transitory computer-readable media of any of examples 118-120, wherein the PCID is the same as a PCID of another cell of the cellular network, and the VCID is different than a VCID associated with the another cell.

Example 122 may include the one or more non-transitory computer-readable media of any of examples 118-120, wherein the cellular network is a coordinated multi point (COMP) cellular network.

Example 123 may include the one or more non-transitory computer-readable media of any of examples 118-120, wherein the parameter is a sequence associated with the RS or a resource element mapping associated with the RS.

Example 124 may include a transmit station of a cell in wireless network, the transmit station comprising: reference signal (RS) circuitry to generate, based on a virtual cell identifier (VCID) associated with the cell that is different than a physical cell identifier (PCID) associated with the cell, a parameter of a RS; and transmit circuitry coupled with the RS circuitry, the transmit circuitry to transmit a RS based on the parameter and the VCID to a user equipment (UE) in the cellular network.

Example 125 may include the transmit station of example 124, wherein the RS is a positioning RS (PRS) or a discovery RS (DRS).

Example 126 may include the transmit station of example 124, wherein the RS circuitry is further to generate the RS based on a pseudo-random sequence based on the VCID.

Example 127 may include the transmit station of any of examples 124-126, wherein the PCID is the same as a PCID of another cell of the cellular network, and the VCID is different than a VCID associated with the another cell.

Example 128 may include the transmit station of any of examples 124-126, wherein the cellular network is a coordinated multi point (COMP) cellular network.

Example 129 may include the transmit station of any of examples 124-126, wherein the parameter is a sequence associated with the RS or a resource element mapping associated with the RS.

Example 130 may include a method comprising: identifying, by a user equipment (UE) in a cellular network, a received reference signal (RS) as an RS of a cell of the cellular network based on a received virtual cell identifier (VCID) of the cell that is different than a physical cell identifier (PCID) of the cell; measure a signal characteristic of the RS; and transmit an indication of the cell and an indication of the signal characteristic.

Example 131 may include the method of example 130, wherein the signal characteristic is a reference signal time difference (RSTD) of the RS or a measurement related to radio resource management (RRM) of the RS.

Example 132 may include the method of example 130, wherein the cellular network is a coordinated multi point (COMP) cellular network.

Example 133 may include the method of any of examples 130-132, wherein the RS is a first RS and further comprising: generating a second RS based on the VCID; and identifying that the first RS and the second RS are equivalent.

Example 134 may include the method of example 133, wherein the generating the second RS includes generating a pseudo-random sequence based on the VCID.

Example 135 may include the method of any of examples 130-132, wherein the RS is a physical RS (PRS) or a discovery RS (DRS).

Example 136 may include a user equipment (UE) of a cellular network, the UE comprising: means to identify a received reference signal (RS) as an RS of a cell of the cellular network based on a received virtual cell identifier (VCID) of the cell that is different than a physical cell identifier (PCID) of the cell; means to measure a signal characteristic of the RS; and means to transmit an indication of the cell and an indication of the signal characteristic.

Example 137 may include the UE of example 136, wherein the signal characteristic is a reference signal time difference (RSTD) of the RS or a measurement related to radio resource management (RRM) of the RS.

Example 138 may include the UE of example 136, wherein the cellular network is a coordinated multi point (COMP) cellular network.

Example 139 may include the UE of any of examples 136-138, wherein the RS is a first RS and further comprising: means to generate a second RS based on the VCID; and means to identify that the first RS and the second RS are equivalent.

Example 140 may include the UE of example 139, wherein the means to generate the second RS include means to a pseudo-random sequence based on the VCID.

Example 141 may include the UE of any of examples 136-138, wherein the RS is a physical RS (PRS) or a discovery RS (DRS).

Example 142 may include one or more non-transitory computer-readable media comprising instructions to cause a user equipment (UE) of a cellular network, upon execution of the instructions by one or more processors of the UE, to: identify a received reference signal (RS) as an RS of a cell of the cellular network based on a received virtual cell identifier (VCID) of the cell that is different than a physical cell identifier (PCID) of the cell; measure a signal characteristic of the RS; and transmit an indication of the cell and an indication of the signal characteristic.

Example 143 may include the one or more non-transitory computer-readable media of example 142, wherein the signal characteristic is a reference signal time difference (RSTD) of the RS or a measurement related to radio resource management (RRM) of the RS.

Example 144 may include the one or more non-transitory computer-readable media of example 142, wherein the cellular network is a coordinated multi point (COMP) cellular network.

Example 145 may include the one or more non-transitory computer-readable media of any of examples 142-144, further comprising instructions to: generate a second RS based on the VCID; and identify that the first RS and the second RS are equivalent.

Example 146 may include the one or more non-transitory computer-readable media of example 145, wherein the instructions to generate the second RS include instructions to generate a pseudo-random sequence based on the VCID.

Example 147 may include the one or more non-transitory computer-readable media of any of examples 142-144, wherein the RS is a physical RS (PRS) or a discovery RS (DRS).

Example 148 may include a user equipment (UE) of a cellular network, the UE comprising: reference signal (RS) measurement circuitry to: identify a received RS as an RS of a cell of the cellular network based on a received virtual cell identifier (VCID) of the cell that is different than a physical cell identifier (PCID) of the cell; and measure a signal characteristic of the RS; and transmit circuitry coupled with the RS measurement circuitry, the transmit circuitry to transmit an indication of the cell and an indication of the signal characteristic.

Example 149 may include the UE of example 148, wherein the signal characteristic is a reference signal time difference (RSTD) of the RS or a measurement related to radio resource management (RRM) of the RS.

Example 150 may include the UE of example 148, wherein the cellular network is a coordinated multi point (COMP) cellular network.

Example 151 may include the UE of any of examples 148-150, wherein the RS is a first RS and the RS measurement is further to: generate a second RS based on the VCID; and identify that the first RS and the second RS are equivalent.

Example 152 may include the UE of example 151, wherein the RS measurement circuitry is further to generate a pseudo-random sequence based on the VCID.

Example 153 may include the UE of any of examples 148-150, wherein the RS is a physical RS (PRS) or a discovery RS (DRS).

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A user equipment (UE) in a cellular network that includes a plurality of cells, the UE comprising:
  a receive circuitry to receive a reference signal (RS) and a time instance associated with RS transmission;
  an RS measurement circuitry coupled with the receive circuitry, the RS measurement circuitry to:
    identify, based on a comparison of the time instance with a muting pattern, the RS as an RS associated with a cell of the plurality of cells; and
    identify, based on the muting pattern, an RS measurement related to the received RS; and
  a transmit circuitry coupled with the RS measurement circuitry, the transmit circuitry to transmit, to an evolved NodeB (eNB), the RS measurement and an indication of the cell of the plurality of cells.

2. The UE of claim 1, wherein the RS is a positioning RS (PRS) or a discovery RS (DRS).

3. The UE of claim 1, wherein the RS measurement is a reference signal time difference (RSTD) or a measurement related to radio resource management (RRM).

4. The UE of claim 1, wherein the cellular network is a coordinated multi point (CoMP) cellular network.

5. The UE of claim 1, wherein the UE further comprises a baseband processor coupled with the receive circuitry.

6. The UE of claim 1, wherein the time instance is a subframe of a radio frame or a unit of the subframe.

7. The UE of claim 1, wherein the indication of the identified cell is an indication of a muting pattern associated with the identified cell.

8. The UE of claim 1, wherein the RS is based on a physical cell identifier (PCID) of the identified cell.

9. A method comprising:
   receiving, by a user equipment (UE) in a cellular network that includes a plurality of cells, a reference signal (RS) and a time instance associated with RS transmission;
   identifying, by the UE based on a comparison of the time instance with a muting pattern, the RS as an RS associated with a cell of the plurality of cells;
   identifying, by the UE based on the muting pattern, an RS measurement related to the received RS; and
   transmitting, by the UE to an evolved NodeB (eNB), the RS measurement and an indication of the cell of the plurality of cells.

10. The method of claim 9, wherein the RS is a positioning RS (PRS) or a discovery RS (DRS).

11. The method of claim 9, wherein the RS measurement is a reference signal time difference (RSTD) or a measurement related to radio resource management (RRM).

12. The method of claim 9, wherein the cellular network is a coordinated multi point (CoMP) cellular network.

13. The method of claim 9, wherein the time instance is a subframe of a radio frame or a unit of the subframe.

14. The method of claim 9, wherein the indication of the identified cell is an indication of a muting pattern associated with the identified cell.

15. The method of claim 9, wherein the RS is based on a physical cell identifier (PCID) of the cell.

* * * * *